(12) United States Patent
Lefebvre et al.

(10) Patent No.: US 11,767,792 B1
(45) Date of Patent: Sep. 26, 2023

(54) COMPRESSOR SCROLL SPIGOT FIT LOAD INTERFACE

(71) Applicant: PRATT & WHITNEY CANADA CORP., Longueuil (CA)

(72) Inventors: Guy Lefebvre, St-Bruno-de-Montarville (CA); Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/808,317

(22) Filed: Jun. 23, 2022

(51) Int. Cl.
*F02C 7/06* (2006.01)
*F02C 3/08* (2006.01)
*F02C 7/20* (2006.01)
*F01D 25/16* (2006.01)
*F01D 25/24* (2006.01)

(52) U.S. Cl.
CPC .............. *F02C 7/06* (2013.01); *F01D 25/162* (2013.01); *F01D 25/24* (2013.01); *F02C 3/08* (2013.01); *F02C 7/20* (2013.01); *F05D 2220/32* (2013.01); *F05D 2230/60* (2013.01); *F05D 2240/14* (2013.01); *F05D 2240/50* (2013.01)

(58) Field of Classification Search
CPC ...... F02C 7/06; F02C 3/08; F02C 7/20; F01D 25/162; F01D 25/24; F05D 2220/32; F05D 2230/60; F05D 2240/14; F05D 2240/50
See application file for complete search history.

(56) References Cited

U.S. PATENT DOCUMENTS

| | | | | |
|---|---|---|---|---|
| 8,371,127 | B2* | 2/2013 | Durocher | F02C 7/12 60/806 |
| 10,190,598 | B2* | 1/2019 | Veitch | F04D 29/644 |
| 11,174,786 | B2* | 11/2021 | Mook | F02C 7/06 |
| 11,306,616 | B2 | 4/2022 | Lefebvre et al. | |
| 2016/0003161 | A1* | 1/2016 | Grogg | F02C 7/00 415/177 |
| 2016/0281534 | A1* | 9/2016 | Noel | F02C 7/06 |
| 2017/0362947 | A1* | 12/2017 | Nasir | F02C 3/04 |
| 2021/0215169 | A1 | 7/2021 | Niwa et al. | |

* cited by examiner

*Primary Examiner* — Jesse S Bogue
(74) *Attorney, Agent, or Firm* — NORTON ROSE FULBRIGHT CANADA LLP.

(57) ABSTRACT

There is provided a load transfer interface in an aircraft engine for transferring a load from a bearing housing to an engine casing. The load transfer interface comprises a first component operatively coupled to and receiving the load from the bearing housing. The first component has a first annular body with a spigot extending axially from the first annular body. The interface comprises a second component operatively coupled to the first component and to the engine casing. The second component has a second annular body with a spigot-receiving cavity disposed therein. The spigot-receiving cavity is shaped and positioned to receive the spigot of the first component. The second component receives the load from the first component and transfers the load to the engine casing.

16 Claims, 8 Drawing Sheets

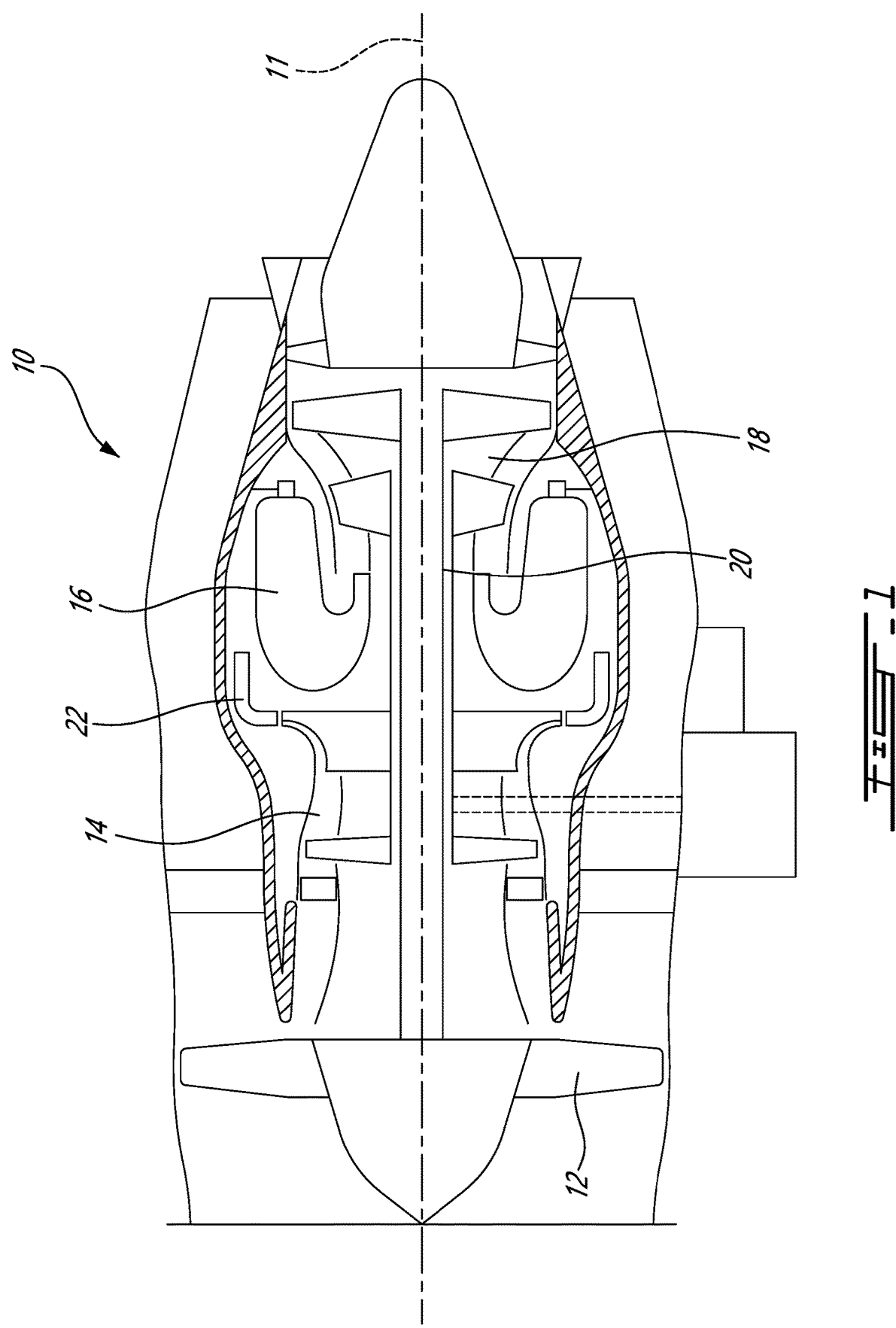

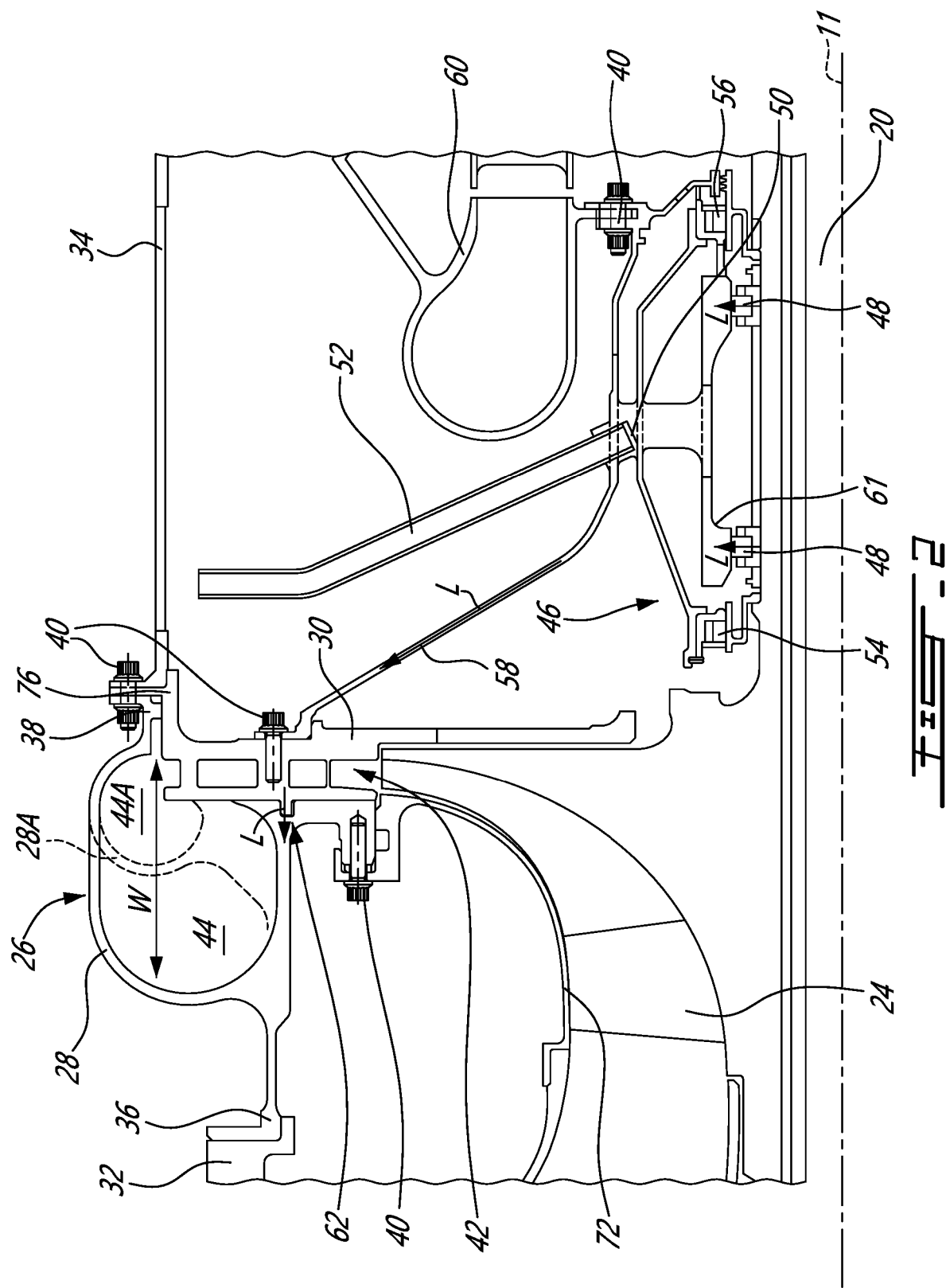

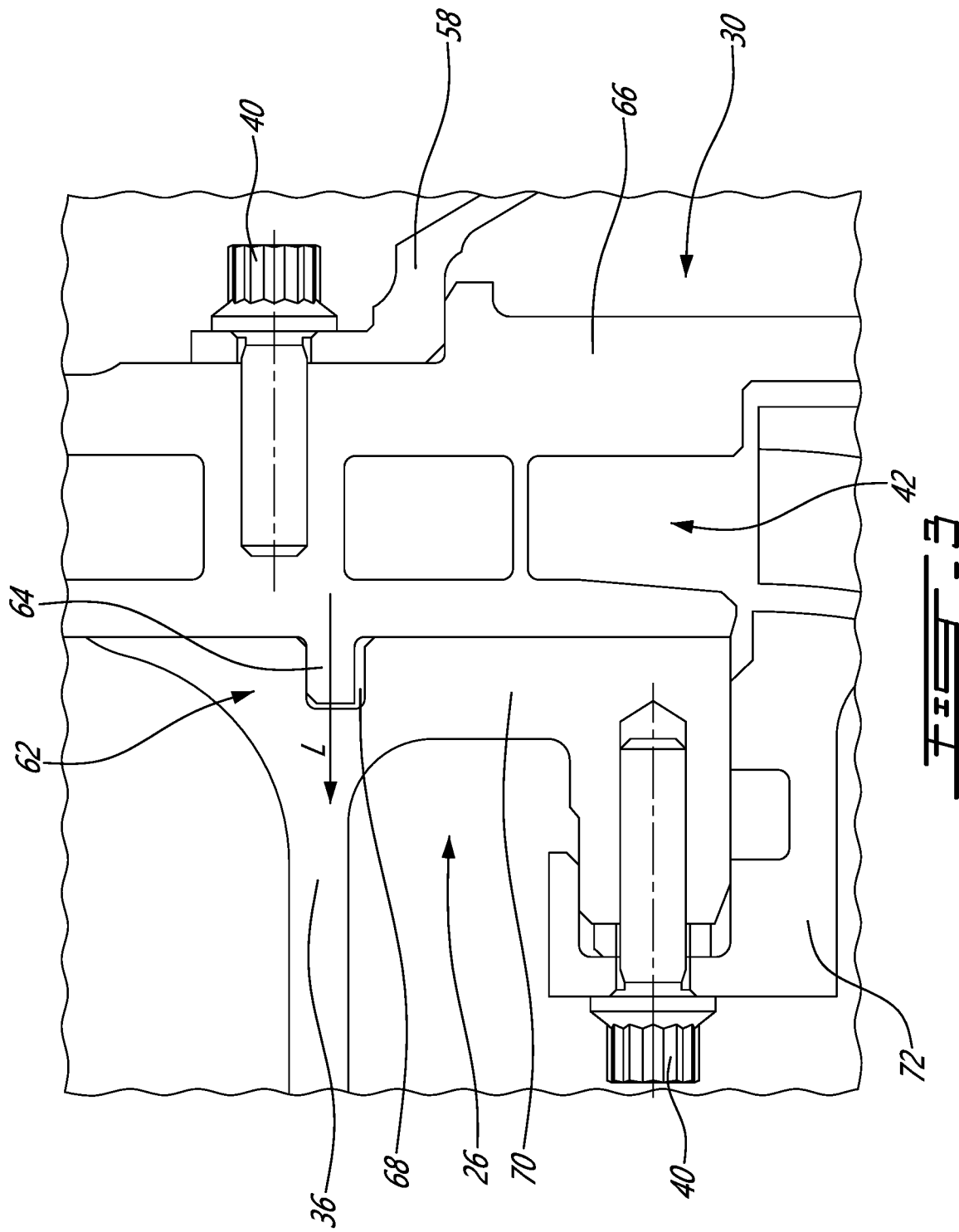

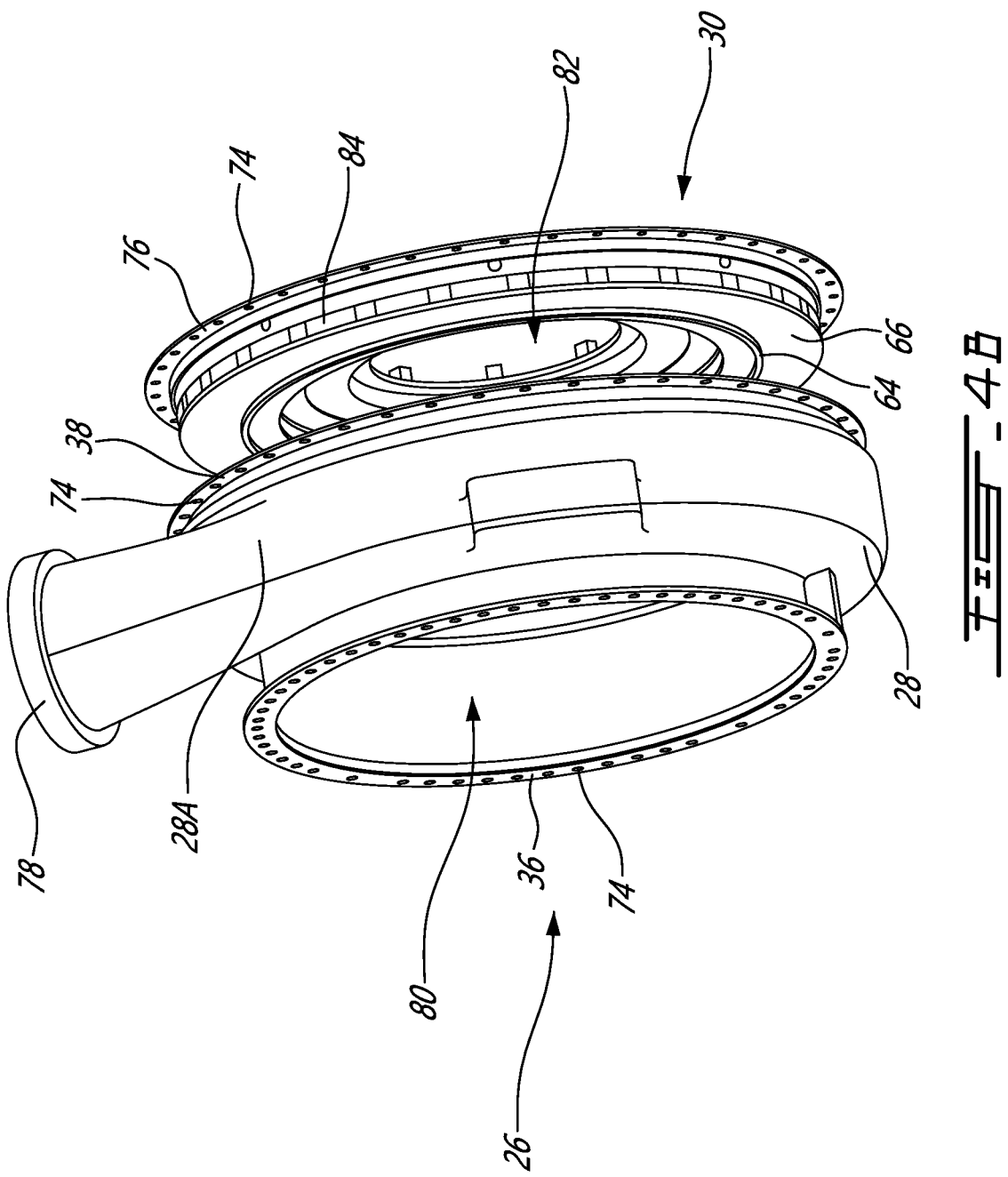

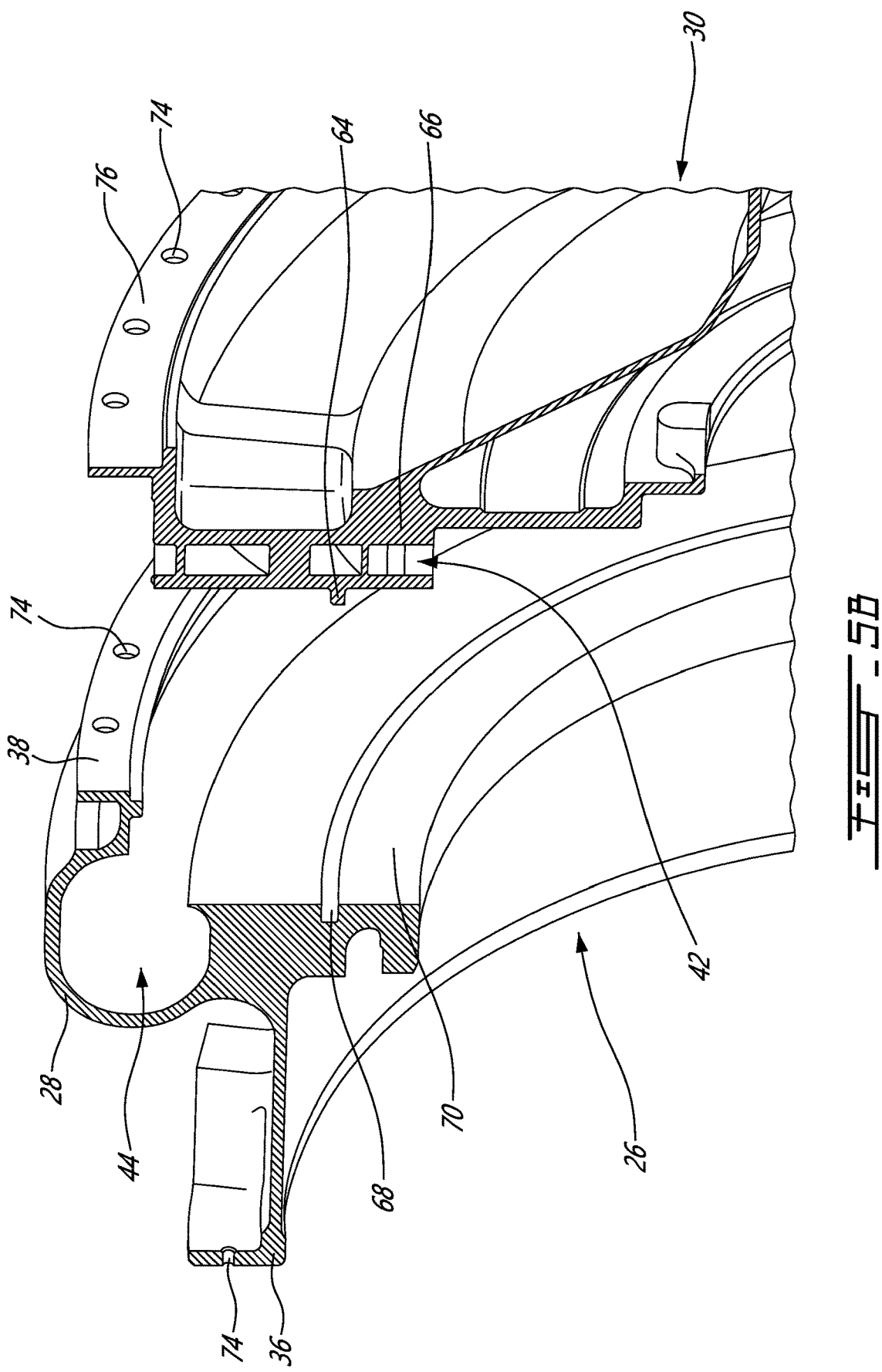

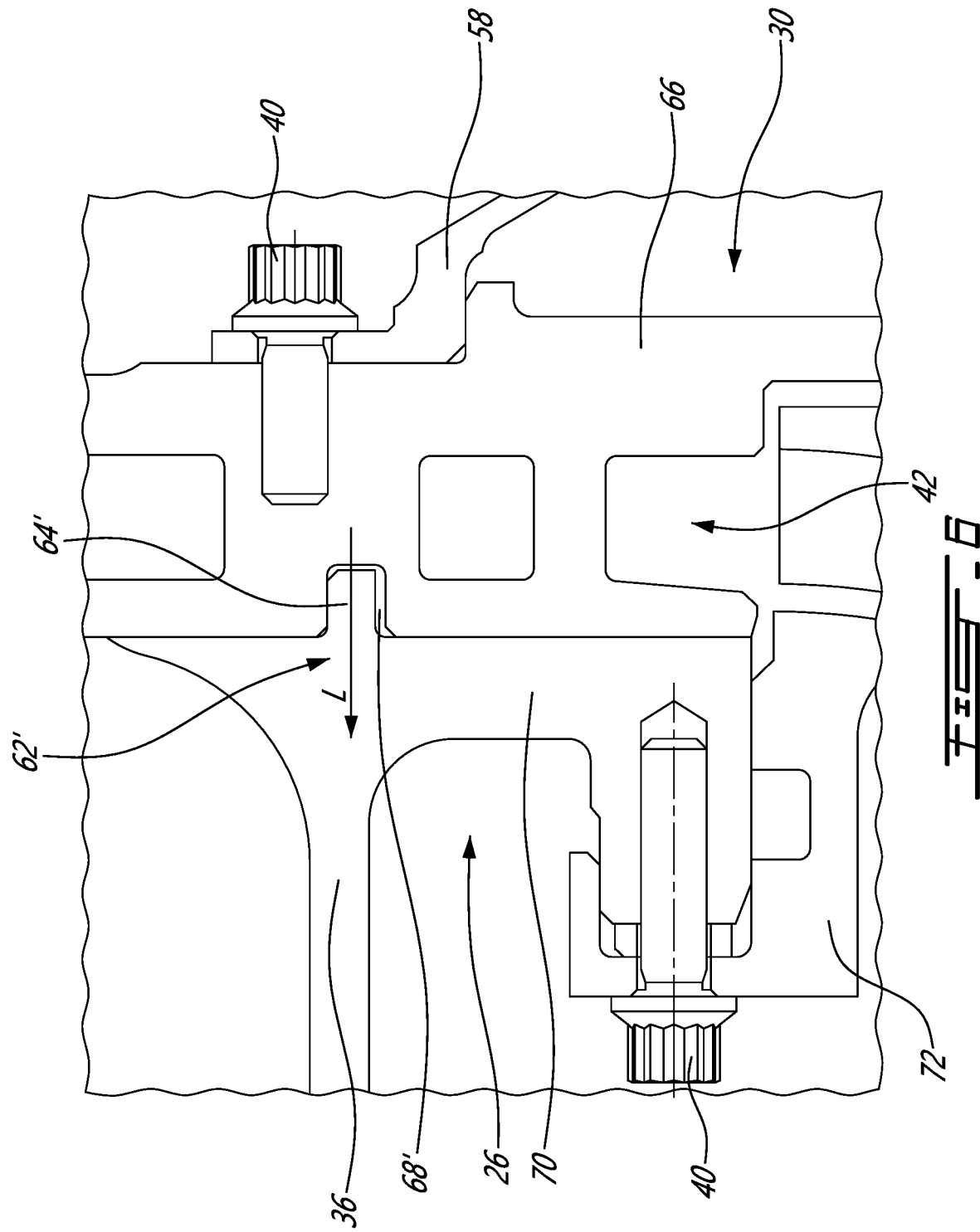

COMPRESSOR SCROLL SPIGOT FIT LOAD INTERFACE

TECHNICAL FIELD

The present disclosure relates generally to aircraft engines and, more particularly, to load transfer interfaces for aircraft engines.

BACKGROUND

In aircraft engines, loads from the engine shaft are transferred from the engine shaft to the engine casing. In engines with centrifugal impellers housed in scroll housings, the loads are typically transferred to the engine casing through the scroll housing at radially outer flanges of the scroll housing. As scroll housings typically include asymmetrical outer walls, the load distribution through the scroll housing may not be consistent throughout.

SUMMARY

In one aspect, there is provided a load transfer interface in an aircraft engine for transferring a load from a bearing housing to an engine casing, comprising: a first component operatively coupled to and receiving the load from the bearing housing, the first component having a first annular body with a spigot extending axially from the first annular body relative to a central engine axis; and a second component operatively coupled to the first component and to the engine casing, the second component having a second annular body with a spigot-receiving cavity disposed therein, the spigot-receiving cavity shaped and positioned to receive the spigot of the first component, the second component receiving the load from the first component and transferring the load to the engine casing.

In accordance with another aspect, there is provided an aircraft engine comprising: a shaft extending along a central engine axis; a bearing housing including one or more bearings rotationally supporting one or more rotors on the shaft; an engine casing; a scroll housing surrounding the shaft and housing a centrifugal impeller, the scroll housing including a scroll outer wall and a scroll housing annular body with a spigot-receiving cavity defined in the scroll housing annular body, the scroll housing operatively coupled to the engine casing; and a scroll coverplate operatively coupled to the scroll housing and to the bearing housing, the scroll coverplate having a scroll coverplate annular body with a spigot protruding axially from the scroll coverplate annular body, the spigot received in the spigot-receiving cavity; wherein a load-bearing path is defined between the shaft and the engine casing through the bearing housing, the scroll coverplate, the spigot, the spigot-receiving cavity, and the scroll housing.

In accordance with a still further general aspect, there is provided a method of assembling a load transfer interface in an aircraft engine, comprising: operatively coupling a first component to a bearing housing, the bearing housing including one or more bearings rotationally supporting one or more rotors on a shaft of the aircraft engine, the first component including a spigot extending axially from a first annular body of the first component; operatively coupling the first component to a second component, the second component including an asymmetrically shaped outer wall and a second annular body with a spigot-receiving cavity defined in the second annular body, the spigot-receiving cavity disposed radially inwardly of the asymmetrically shaped outer wall and receiving the spigot; and operatively coupling the second component to an engine casing of the aircraft engine.

BRIEF DESCRIPTION OF THE DRAWINGS

Reference is now made to the accompanying figures in which:

FIG. 1 is a schematic cross sectional view of a gas turbine engine;

FIG. 2 is a cross sectional view of an intersection between the cold and hot sections of a gas turbine engine, according to an embodiment of the present disclosure;

FIG. 3 is an enhanced cross sectional view of a spigot interface at the compressor scroll of FIG. 2;

FIGS. 4A and 4B are exploded front and rear perspective views, respectively, of a compressor scroll and compressor scroll housing with a spigot interface according to an embodiment of the present disclosure;

FIGS. 5A and 5B are enhanced partial cross sectional and exploded partial cross sectional views, respectively, of the compressor scroll and compressor scroll housing of FIGS. 4A and 4B; and FIG. 6 is an enhanced cross sectional view of a spigot interface according to another embodiment of the present disclosure.

DETAILED DESCRIPTION

Figure 4A:
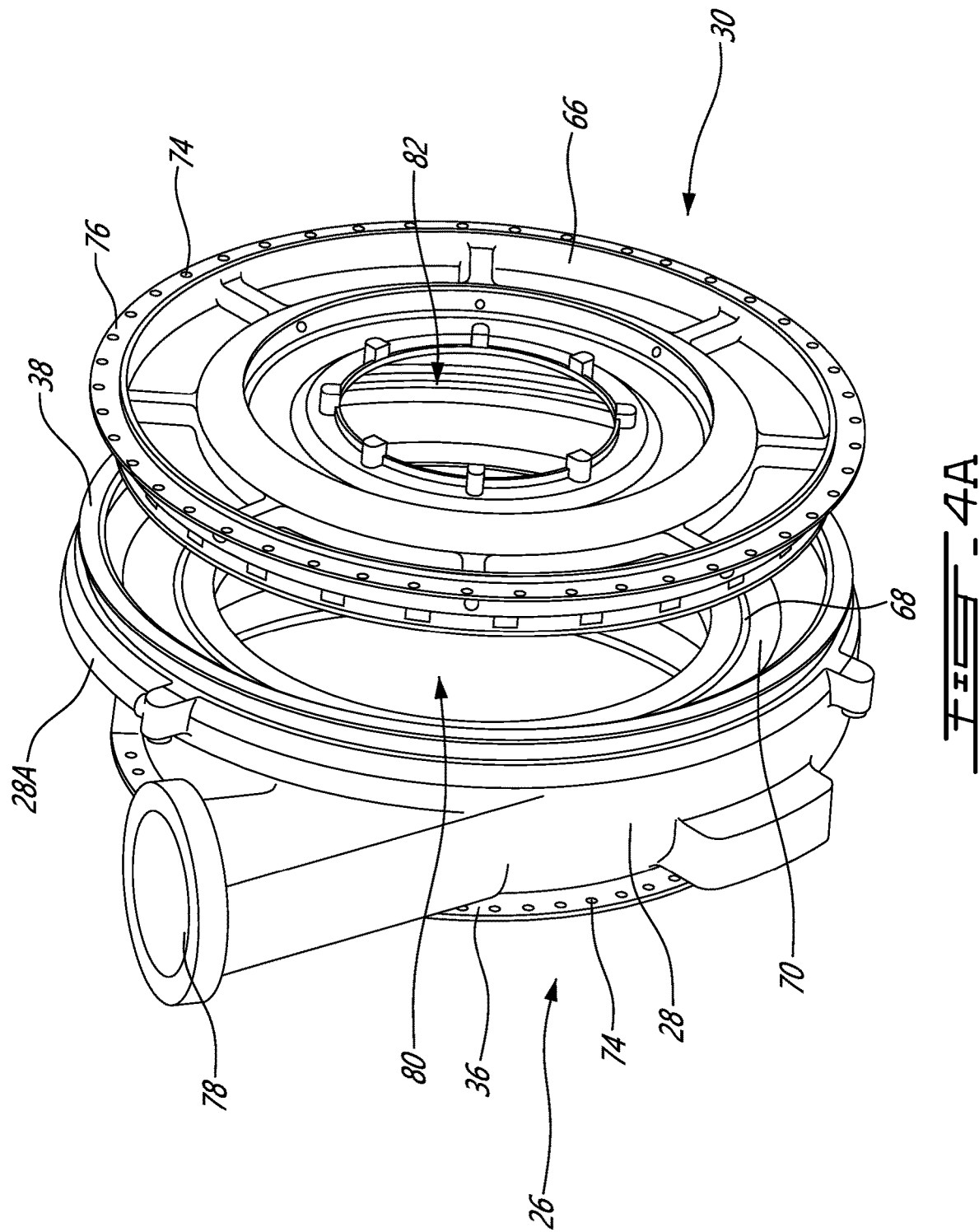

FIG. 1 illustrates a gas turbine engine 10 of a type preferably provided for use in subsonic flight, generally comprising in serial flow communication a fan 12 through which ambient air is propelled, a compressor 14 for pressurizing the air, a combustor 16 in which the compressed air is mixed with fuel and ignited for generating an annular stream of hot combustion gases, and a turbine section 18 for extracting energy from the combustion gases. A shaft 20 interconnects the fan 12, the compressor 14 and the turbine 18 and is rotatable about central engine axis 11. In use, pressurized air provided by the compressor 14 through a diffuser 22 enters the combustor 16 for combustion. While FIG. 1 shows gas turbine engine 10 to be a turbofan gas turbine engine, it is understood that the present disclosure is applicable to other types of aircraft engines as well. For instance, the engine could be a turboprop engine, a turboshaft engine or an auxiliary power unit (APU). Furthermore, it is understood that the engine could be a hybrid aircraft engine including an electric motor in combination with a turbine engine. The engine could also be a compounded engine comprising an internal combustion engine compounding power with a turbine engine.

FIG. 2 show an enhanced view of the engine 10 proximate the intersection between the cold section (with compressor 14) and the hot section (with turbine 18). A compressor 14 as in FIG. 1, which may include multiple axial stage rotors, is followed by a centrifugal impeller 24 housed in a scroll housing 26 with a scroll outer wall 28 and a scroll coverplate 30. Other combinations of axial and centrifugal compressor stages may be contemplated. The compressor 14 supplies pressurized air to the combustor 16 (not shown in FIG. 2), the hot gases from which drive turbine 18 as in FIG. 1. The scroll housing 26 is illustratively mounted or fixed to the engine casing, specifically to a forward engine casing 32 and a rear engine casing 34, respectively, via a forward scroll flange 36 and a rear scroll flange 38. A plurality of fasteners 40, for instance bolts, fasten the various components together. In an exemplary embodiment, gasses compressed by the upstream compressor 14 are directed via impeller 24 through a diffuser 42 formed in the coverplate 30 to an annular scroll area 44 in the scroll housing 26 before being directed to the combustor 16, for instance via diffuser 22 as in FIG. 1.

As further shown in FIG. 2, a bearing housing 46 houses two bearings 48 which rotationally support rotors such as the compressor 14 and turbine 18 on the shaft 20. In the shown case, the bearings 48 are roller bearings, although other bearings such as a ball bearings may be contemplated as well. In other cases, other numbers of bearings 48 may be housed in bearing housing 46. The bearings 48, housed within an interior chamber of the bearing housing 46, and the shaft 20 are lubricated and/or cooled with oil distributed by an oil manifold 50 in the bearing housing 46. The oil may be provided by a conduit 52 from an oil source within the engine 10. A front carbon seal 54 as well as a rear carbon seal 56 may be mounted within the bearing housing 46 to ensure that oil is sealed within the bearing housing 46. A bearing housing cover 58 covers the bearing housing 46 and joins the bearing housing 46 to the scroll coverplate 30 on an upstream side of the bearing housing 46, and joins the bearing housing 48 to a turbine intake 60 of the turbine 18 on a downstream side of the bearing housing 46, illustratively via fasteners 40.

Loads from the bearing housing 46, in particular from the shaft 20, are to be transferred to the engine casing, illustratively to forward engine casing 32. A load path L is therefore defined from the shaft 20 radially thorough the bearings 48, through a bearing housing structural member 61, through the bearing housing cover 58 to the scroll coverplate 30, and from the scroll coverplate 30 to the scroll housing 26 via a spigot interface 62, as will be discussed in further detail below. From the scroll housing 26, the load may be transferred to the forward engine casing 32 via engagement between the forward engine casing 32 and the forward scroll flange 36.

As shown in FIG. 2, the scroll outer wall 28, and consequently the annular scroll area 44 defined therein, may be asymmetrically shaped. In other words, a width W of the scroll area 44, illustratively taken in a direction parallel to the central engine axis 11, may vary along the circumference of the scroll housing 26. Illustratively, a narrower portion of the scroll outer wall 28A with reduced cross sectional scroll area 44A is shown in FIG. 2 to depict the asymmetric nature of the scroll housing 26. The scroll housing 26 may include asymmetric portions, for instance the radially outer portions of the scroll outer wall 28, as well as axisymmetric portions, for instance the forward scroll flange 36 and rear scroll flange 38, with respect to the central engine axis 11. The spigot interface 62 may therefore be located at an axisymmetric portion of the scroll housing 26, for instance to ensure a symmetrical load distribution between the various components.

Referring to FIG. 3, an exemplary spigot interface 62 for transferring loads from the bearing housing 46 to the engine casing is shown in more detail. The spigot interface 62, and the various components defining the spigot interface, may thus be referred to as a load transferring interface. In the shown case, the spigot interface 62 includes a spigot 64 protruding axially from an annular body 66 of the scroll coverplate 30 that is received in a spigot-receiving cavity 68 disposed in an annular body 70 of the scroll housing 26. As will be discussed below with reference to FIG. 6, the reverse arrangement may be contemplated, i.e., a spigot 64 may protrude axially from the scroll housing 26 and be received in a cavity 68 disposed in the scroll coverplate 30. As shown in FIG. 3, fasteners 40 fasten various components together, illustratively the bearing housing cover 58 to the scroll coverplate 30 and the scroll housing 26 to an impeller cover 72. The insertion of the spigot 64 into the spigot-receiving cavity 68 thus results in a spigot fit, i.e., a circumferentially-tight fit, between the scroll coverplate 30 and the scroll housing 26, which may allow for better control of a load path L initiated at the bearing housing 58. It is understood that the depicted scroll housing 26 and scroll coverplate 30 are exemplary, as the herein described spigot interface 62 may be applied to other components in engine 10 for defining a load path between the bearing housing 58 and the engine casing.

Figure 5A:
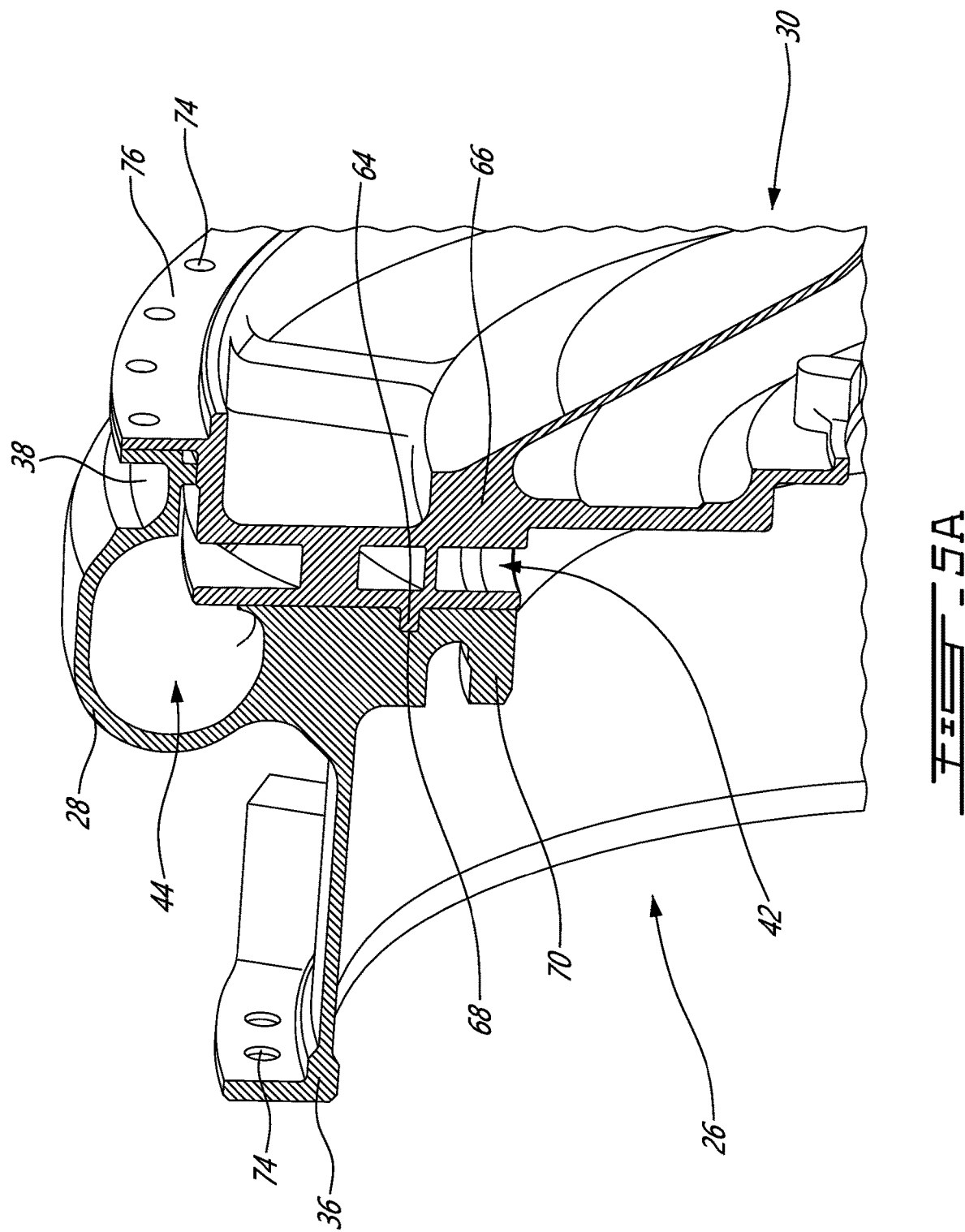

Referring additionally to FIGS. 4A-5B, the scroll housing 26 and coverplate 30 of FIGS. 2-3 are shown in more detail. In the shown case, both the spigot 64 and the spigot-receiving cavity 68 are continuous, or uninterrupted, about their circumferences. As such, the spigot interface 62 may act as a seal between the scroll coverplate 30 and the scroll housing 26. In other embodiments, the spigot 64 may be circumferentially interrupted, i.e., two or more spigot arc segments about the circumference of the annular body 66 may make up the spigot 64, with various cavity portions 68 disposed in the scroll housing 26 to match the spigot segments 64. In such cases, additional sealing means between the scroll housing 26 and coverplate 30 may be provided.

As shown in FIG. 4A-5B, the forward scroll flange 36 and rear scroll flange 38 include holes 74 formed therethrough to allow for the installation of fasteners 40. Similarly, the scroll coverplate 30 illustratively includes an outer flange 76 with holes 74 formed therethrough. FIGS. 4A-5B further show a scroll outlet 78, for instance to direct gasses from the annular scroll area 44 to the diffuser 22. Gasses directed by the impeller 24 may be directed into the annular scroll area 44 via scroll diffuser 42 with scroll diffuser outlets 84.

As shown in FIG. 2, an exemplary assembly arrangement may include the outer flange 76 of the scroll coverplate 30 disposed between the rear scroll flange 38 and a corresponding flange of the rear engine casing 34. Unlike typical scroll arrangements where loads are transferred to the engine casing at this outer flange 76, where the scroll housing 26 may be asymmetrically shaped, the present disclosure teaches a spigot interface 62 for transferring the loads from the bearing housing 46 to the engine casing, illustratively to the forward engine casing 32, at an axisymmetric location on the scroll housing 26. By axisymmetric, it is understood that the structure of the scroll housing is continuous about its circumference, and thus the transmission of the load from the scroll coverplate 30 to the scroll housing 26 may be continuous or constant about their circumferences as well. In the shown case, this axisymmetric location where the load is transferred is located radially inwardly of the rear scroll flange 38 and the outer flange 76 of the scroll coverplate 30. The asymmetric structure of the scroll housing 26, i.e., the scroll outer wall 28, may therefore be bypassed with regards to load transfer. As best shown in FIG. 3, the spigot interface 62 may be collinear, i.e., at a same radial distance from the engine axis 11, for optimal load transfer between the scroll coverplate 30 and the scroll housing 26. Other radial locations for the load transfer may be contemplated. As discussed above, scroll housing 26 has an annular body 70, illustratively with central opening 80, while scroll coverplate 30 has an annular body 66, illustratively with central opening 82.

As the asymmetrical structure of the scroll housing 26, illustratively the scroll outer wall 28, is not used to transfer loads from the bearing housing 46 to the engine casing, the material property requirements for the scroll outer wall 28 may be less stringent. A axisymmetric load path L may thus be defined through an asymmetric component. In typical scroll housings 26 where the load is transferred at the outer flange 76, the scroll outer wall 28 plays a role in the load transfer and its structure may thus be required to underdo such load transfers. Conversely, the scroll outer wall 28 according to the present disclosure is bypassed during load transfer, and as such the wall thickness may be made thinner than typical scroll outer walls. Different materials may additionally be selected for the scroll outer wall 28 that are not required to support the load transfer. This may contribute to an overall lighter scroll housing 26 than typical scroll housings. In some embodiments, the spigot interface 62 may be operable to transfer the entirety of the load from the bearing housing 46 to the scroll housing 26 (and thus to the forward engine casing 32).

As best shown in FIG. 3, the exemplary spigot 64 is chamfered at a distal, radially outer end thereof. For instance, this chamfered end may facilitate engagement and installation with the spigot-receiving cavity 68. In addition, the shown spigot 64 has a curved radially-inner junction between it and the annular body 66 of the scroll coverplate 30, for instance to optimize stress distribution. Other shapes for spigot 64 may be contemplated. The relative dimensions of the spigot 64 and spigot-receiving cavity 68 may vary, for instance based on the sizes of the scroll housing 26 and scroll coverplate 30, and/or the magnitude of the loads being transferred between components. In addition, as shown in FIG. 3, an axial length (or depth) of the spigot-receiving cavity 68 may be greater than an axial length of the spigot 64 to ensure that the annular body 66 of the scroll coverplate 30 makes full contact with the annular body 70 of the scroll housing 26. A radial width of the spigot-receiving cavity 68 may be greater than a radial width of the spigot 64, for instance to ensure tolerance requirements are met.

Referring to FIG. 6, another embodiment of a spigot interface 62' is shown. Unless otherwise specified, like reference numerals refer to like components. In the embodiment shown in FIG. 6, the spigot interface 62' includes a spigot 64' protruding axially from the annular body 70 of the scroll housing 26 that is received in a spigot-receiving cavity 68' disposed in the annular body 66 of the scroll coverplate 30. As such, the load L from the bearing housing 46 may be transferred from the scroll coverplate 30 to the scroll housing 26, and then subsequently to the engine casing, via spigot interface 62'.

It can be appreciated from the foregoing that at least some embodiments teach an interlocking or spigot fit connection between components at axisymmetric locations thereon in an aircraft engine for transferring loads, thereby allowing for consistent or symmetrical load transferring and lighter components.

The present disclosure further teaches a method of assembling a load transfer interface in an aircraft engine. A first component, for instance the scroll coverplate 30, is operatively coupled to a bearing housing 46, the bearing housing 46 including one or more bearings 48 rotationally supporting one or more rotors on a shaft 20 of the aircraft engine 10. The first component includes a spigot 64 extending axially from a first annular body 66 of the first component. The first component is operatively coupled to a second component, for instance the scroll housing 26, the second component including an asymmetrically shaped outer wall 28 and a second annular body 70 with a spigot-receiving cavity 68 defined in the second annular body 70, the spigot-receiving cavity 68 disposed radially inwardly of the asymmetrically shaped outer wall 28 and receiving the spigot 64. The second component is operatively coupled to an engine casing, for instance forward engine casing 32, of the aircraft engine 10.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A load transfer interface in an aircraft engine for transferring a load from a bearing housing to an engine casing, comprising:
    a scroll cover plate operatively coupled to and receiving the load from the bearing housing, the scroll cover plate having a first annular body with a spigot extending axially from the first annular body relative to a central engine axis; and
    a scroll housing operatively coupled to the scroll cover plate and to the engine casing, the scroll housing having a second annular body with a spigot-receiving cavity disposed therein, the spigot-receiving cavity shaped and positioned to receive the spigot, the scroll housing receiving the load from the scroll cover plate and transferring the load to the engine casing, the scroll housing including a radially outer wall that is asymmetrically-shaped about a circumference of the second annular body, the spigot-receiving cavity disposed radially inwardly of the radially outer wall, and wherein an axial width of a radially outer scroll area defined by the radially outer wall varies along a circumference of the scroll housing.

2. The load transfer interface as defined in claim 1, wherein the scroll coverplate includes a diffuser for directing air from the centrifugal impeller to an annular scroll area in the scroll housing.

3. The load transfer interface as defined in claim 1, wherein the spigot extends continuously about a circumference of the first annular body.

4. The load transfer interface as defined in claim 1, wherein the spigot incudes a plurality of spigot arc segments about a circumference of the first annular body.

5. The load transfer interface as defined in claim 1, wherein the scroll housing is operatively coupled to the engine casing at a second flange, the second flange axially collinear with the spigot-receiving cavity.

6. The load transfer interface as defined in claim 1, wherein a radially inner junction between the spigot and the first annular body is curved.

7. An aircraft engine comprising:
    a shaft extending along a central engine axis;
    a bearing housing including one or more bearings rotationally supporting one or more rotors on the shaft;
    an engine casing;
    a scroll housing surrounding the shaft and housing a centrifugal impeller, the scroll housing including a scroll outer wall and a scroll housing annular body with a spigot-receiving cavity defined in the scroll housing annular body, the scroll housing operatively coupled to the engine casing; and
    a scroll coverplate operatively coupled to the scroll housing and to the bearing housing, the scroll coverplate having a scroll coverplate annular body with a spigot protruding axially from the scroll coverplate annular body, the spigot received in the spigot-receiving cavity;

wherein a load-bearing path is defined between the shaft and the engine casing through the bearing housing, the scroll coverplate, the spigot, the spigot-receiving cavity, and the scroll housing; and wherein the scroll housing includes a radially outer scroll wall that is asymmetrically shaped about a circumference of the scroll housing annular body, and the spigot-receiving cavity is disposed radially inwardly of the radially outer scroll wall.

8. The aircraft engine as defined in claim 7, wherein an axial width of a radially outer scroll area defined by the radially outer scroll wall varies along a circumference of the scroll housing.

9. The aircraft engine as defined in claim 7, wherein the spigot extends continuously about a circumference of the scroll coverplate annular body.

10. The aircraft engine as defined in claim 7, wherein the spigot incudes a plurality of spigot arc segments about a circumference of the scroll coverplate annular body.

11. The aircraft engine as defined in claim 7, wherein the scroll housing is operatively coupled to the engine casing at a scroll housing flange, the scroll housing flange axially collinear with the spigot-receiving cavity.

12. The aircraft engine as defined in claim 7, wherein the bearing housing includes one or more ball bearings rotationally supporting the one or more rotors on the shaft.

13. The aircraft engine as defined in claim 7, wherein the scroll coverplate includes a diffuser for directing air from the centrifugal impeller to an annular scroll area in the scroll housing.

14. The aircraft engine as defined in claim 7, wherein a radially inner junction between the spigot and the scroll coverplate annular body is curved.

15. A load transfer interface in an aircraft engine for transferring a load from a bearing housing to an engine casing, comprising:

a first component operatively coupled to and receiving the load from the bearing housing, the first component having a first annular body with a spigot extending axially from the first annular body relative to a central engine axis; and a second component operatively coupled to the first component and to the engine casing, the second component having a second annular body with a spigot-receiving cavity disposed therein, the spigot-receiving cavity shaped and positioned to receive the spigot of the first component, the second component receiving the load from the first component and transferring the load to the engine casing, the second component operatively coupled to the engine casing at a second component flange, the second component flange axially collinear with the spigot-receiving cavity.

16. The load transfer interface as defined in claim 15, wherein the second component includes a radially outer wall that is asymmetrically shaped about a circumference of the second annular body, and the spigot-receiving cavity is disposed radially inwardly of the radially outer wall of the second component.

* * * * *